United States Patent
Saito et al.

(10) Patent No.: US 12,233,596 B2
(45) Date of Patent: *Feb. 25, 2025

(54) JETTABLE TEMPORARY SOLUBOLIZED PEEK BINDERS TO CREATE REMOVABLE SUPPORT MATERIALS

(71) Applicants: Akira Saito, Kanagawa (JP); Koji Takimoto, Kanagawa (JP); Andrew J. Boydston, Cross Plains, WI (US); Chang-Uk Lee, Seattle, WA (US); Mark A. Ganter, Edmonds, WA (US); Duane W. Storti, Seattle, WA (US)

(72) Inventors: Akira Saito, Kanagawa (JP); Koji Takimoto, Kanagawa (JP); Andrew J. Boydston, Cross Plains, WI (US); Chang-Uk Lee, Seattle, WA (US); Mark A. Ganter, Edmonds, WA (US); Duane W. Storti, Seattle, WA (US)

(73) Assignee: Ricoh Co., Ltd., Tokyo (JP)

( * ) Notice: Subject to any disclaimer, the term of this patent is extended or adjusted under 35 U.S.C. 154(b) by 736 days.

This patent is subject to a terminal disclaimer.

(21) Appl. No.: 16/805,560

(22) Filed: Feb. 28, 2020

(65) Prior Publication Data

US 2021/0268728 A1    Sep. 2, 2021

(51) Int. Cl.
*B29C 64/165* (2017.01)
*B29C 64/112* (2017.01)
(Continued)

(52) U.S. Cl.
CPC ......... *B29C 64/165* (2017.08); *B29C 64/40* (2017.08); *B33Y 10/00* (2014.12); *B33Y 30/00* (2014.12);
(Continued)

(58) Field of Classification Search
CPC ..... B29C 64/165; B29C 64/336; B29C 64/40; B22F 10/14; B22F 10/40; B22F 10/43;
(Continued)

(56) References Cited

U.S. PATENT DOCUMENTS

2016/0257070 A1*   9/2016   Boydston ............... B29C 64/165
2017/0246805 A1*   8/2017   Boydston ................ C08L 71/00
(Continued)

FOREIGN PATENT DOCUMENTS

CN    108424605 A    *    8/2018    ........... B29C 64/112

*Primary Examiner* — Seyed Masoud Malekzadeh
(74) *Attorney, Agent, or Firm* — Patent Law Works LLP (57) ABSTRACT

The present invention provides methods, processes, and systems for the manufacture of three-dimensional articles made of polymers using 3D printing. A layer of prepolymer is deposited on a build plate to form a powder bed. Then, solutions of first and/or second binding agents are printed on the powder bed in a predetermined pattern. After a predetermined period of time, sequential layers are printed to provide the three-dimensional article. The removable binding agent is then removed. The removable binding agent may be solubilized polyetheretherketone. Examples of solubilized polyetheretherketone include, but are not limited to, sulfonated polyetheretherketone and/or nitrated polyetheretherketone. The three-dimensional object can be cured to produce the three-dimensional article composed of the final polymers.

10 Claims, 3 Drawing Sheets
(3 of 3 Drawing Sheet(s) Filed in Color)

(51) Int. Cl.
    *B29C 64/40*      (2017.01)
    *B33Y 10/00*      (2015.01)
    *B33Y 30/00*      (2015.01)
    *B33Y 40/20*      (2020.01)
    *B33Y 70/00*      (2020.01)
    B29C 64/393      (2017.01)
    B29K 71/00      (2006.01)
    B33Y 50/02      (2015.01)

(52) U.S. Cl.
    CPC ............... *B33Y 40/20* (2020.01); *B33Y 70/00* (2014.12); *B29C 64/112* (2017.08); *B29C 64/393* (2017.08); *B29K 2071/00* (2013.01); *B33Y 50/02* (2014.12)

(58) Field of Classification Search
    CPC .... B29K 2071/00; B33Y 10/00; B33Y 30/00; B33Y 40/00; B33Y 40/20
    See application file for complete search history.

(56) References Cited

U.S. PATENT DOCUMENTS

| | | | |
|---|---|---|---|
| 2017/0326790 A1* | 11/2017 | Lee | B29C 64/165 |
| 2018/0236731 A1* | 8/2018 | Natarajan | B22F 10/43 |
| 2019/0160738 A1* | 5/2019 | Okamoto | B22F 10/14 |
| 2019/0275735 A1* | 9/2019 | Lee | B29C 64/153 |
| 2020/0062877 A1* | 2/2020 | Knopf | C08F 220/52 |

\* cited by examiner

JETTABLE TEMPORARY SOLUBOLIZED PEEK BINDERS TO CREATE REMOVABLE SUPPORT MATERIALS

FIELD OF INVENTION

The present invention relates to methods and apparatus for creating three-dimensional articles by printing.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink-jet process. It is a three-stage process of applying a material, printing a UV-curable liquid, which is hardened using a UV source. These steps are repeated layer-by-layer. In conventional 3D printing, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing inter-layer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

A fused deposition modeling (FDM) process for the production of three-dimensional objects using an extrusion-based, digital manufacturing system has also been used. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides methods, processes, and systems for manufacture of three-dimensional articles composed of polymers using 3D printing.

In one aspect, disclosed are methods for manufacturing a three-dimensional article, the method comprising depositing a powder on a build plate to form a powder bed; printing, at selected locations on the powder bed, a first binding agent and/or a second binding agent; exposing the printed solution to a stimulus to form a polymer layer of the three-dimensional article; repeating the steps to manufacture remainder of the three-dimensional article; and removing the second binding agent. The first and second binding agent are each printed at least once and the first and second binding agents may be printed at different selected locations on the powder bed. In one aspect, the first binding agent is a permanent binding agent. In further aspects the second binding agent is a removable binding agent. In a particular aspect, the first binding agent is a permanent binding agent and the second binding agent is a removable binding agent. In a further aspect, the second binding agent may be polyetheretherketone (PEEK) that has been modified to provide solubility in a solvent (i.e. solubilized). Examples of such modified polyetheretherketones include, but are not limited to sulfonated polyetheretherketone (SPEEK) and nitrated polyetheretherketone (NPEEK).

In another aspect, provided are three-dimensional articles made by the process of depositing a powder on a build plate to form a powder bed; printing, at selected locations on the powder bed, a first binding agent and/or a second binding agent; exposing the printed solution to a stimulus to form a polymer layer of the three-dimensional article; repeating the steps to manufacture remainder of the three-dimensional article; and removing the second binding agent. The first and second binding agent are each printed at least once and the first and second binding agents may be printed at different selected locations on the powder bed. In some aspects the second binding agent is one or more solubilized PEEKs. Examples of such solubilized PEEKs include, but are not limited to SPEEK and/or NPEEK. In additional aspects, the second binding agent is removed by a solvent. In certain aspects the solvent to remove the second binding agent is an aqueous solved or an alcohol-based solvent.

In another aspect, a system for printing a three-dimensional article is provided. The system comprising a depositing mechanism to depose a powder layer on a build plate; one or more printing mechanisms to print the first and second binding agents at selected locations; a stimulus mechanism to provide a stimulus to a printed binding agent; and a printing controller to repeat the printing mechanism to print the first and second binding agents on a powder layer exposed to a stimulus at a predetermined condition, These and other aspects of the present invention will become evident upon reference to the following detailed description.

BRIEF DESCRIPTION OF DRAWINGS

This application contains at least one drawing executed in color. Copies of this application publication with color drawing(s) will be provided by the Office upon request and payment of the necessary fee.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

The term "alkyl" means the monovalent branched or unbranched saturated hydrocarbon radical, consisting of carbon and hydrogen atoms, having from one to twenty carbon atoms inclusive, unless otherwise indicated. Examples of alkyl radicals include, but are not limited to, methyl, ethyl, propyl, isopropyl, butyl, isobutyl, sec-butyl, tert-butyl, pentyl, n-hexyl, octyl, dodecyl, and the like.

The term "alkylene" as used herein means the divalent linear or branched saturated hydrocarbon radical, consisting of carbon and hydrogen atoms, having from one to twenty carbon atoms inclusive, unless otherwise indicated. Examples of alkylene radicals include, but are not limited to, methylene, ethylene, trimethylene, propylene, tetramethylene, pentamethylene, ethylethylene, and the like.

The term "alkenylene" means the divalent linear or branched unsaturated hydrocarbon radical, containing at least one double bond and having from two to twenty carbon atoms inclusive, unless otherwise indicated. The alkenylene radical includes the cis or trans ((E) or (Z)) isomeric groups or mixtures thereof generated by the asymmetric carbons. Examples of alkenylene radicals include, but are not limited to ethenylene, 2-propenylene, 1-propenylene, 2-butenyl, 2-pentenylene, and the like.

The term "aryl" means the monovalent monocyclic aromatic hydrocarbon radical consisting of one or more fused rings in which at least one ring is aromatic in nature, which can optionally be substituted with hydroxy, cyano, lower alkyl, lower alkoxy, thioalkyl, halogen, haloalkyl, hydroxyalkyl, nitro, alkoxycarbonyl, amino, alkylamino, dialkylamino, aminocarbonyl, carbonylamino, aminosulfonyl, sulfonylamino, and/or trifluoromethyl, unless otherwise indicated. Examples of aryl radicals include, but are not limited to, phenyl, naphthyl, biphenyl, indanyl, anthraquinolyl, and the like.

As used herein, a "build plate" refers to a solid surface made from material such as glass, metal, ceramic, plastic, polymer, and the like.

The term "halogen" as used herein refers to fluoro, bromo, chloro, iodo, or combinations thereof.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for manufacturing articles made of polymers using three-dimensional printing. The disclosed methods have the advantage of creating removable support features during the 3D printing process. Such support features avoid deformation or fracture of permanent portions of the printed article and are removable through the removal of a binding agent in response to a stimulus once the printing process is complete. The disclosed methods also have the advantage of being able to rapidly print three-dimensional articles that have better mechanical properties, better thermal properties, and the like. The disclosed methods are more flexible than other art methods in that they allow the three-dimensional article to be built with thin or fragile components or around another object, such as a conducting wire to make a circuit.

In one application, a layer of powder is deposited on a build plate as a powder bed, and then a solution of a first binding agent and/or a second binding agent is selectively printed to appropriate regions of the powder bed in accordance with the three-dimensional article being formed. A stimulus may be applied that polymerizes the first binding agent to form the final polymer. Subsequent sequential applications of powder, printing of binding agents, and exposing to a stimulus, complete the formation of the desired 3D article. The three-dimensional article is thus manufactured layer-by-layer. The first and second binding agent are each printed at least once and the first and second binding agents may be printed at different selected locations on the powder bed. Once a suitable number of layers have been deposited, the article is cured to provide the three-dimensional article made of the final polymer. The curing can be performed on the build plate or by removing the article from the build plate and then curing it. The second binding agent is then removed to provide the final product. In particular embodiments, the second binding agent is SPEEK.

In certain applications the first and second binding agents can be the same. By way of non-limiting example, the first and second binding agents may be SPEEK. Portions of the powder bed printed with SPEEK to be retained in the final product can selectively treated to render the SPEEK thereon resistant to removal. Such treatments include, but are not limited to sufficient heat to de-sulfonate the SPEEK and/or sinter the SPEEK and/or the powder to render the SPEEK insoluble.

III. Powder

The three-dimensional form can be made from one or more materials. In certain embodiments, the three-dimensional form is created from a powder that is bound with a binder. Any type of powder can be used to form the three-dimensional form, and the powder can be selected such that the three-dimensional form has the desired properties. Examples of such powders are well known in the art and any such power can be used in the methods described herein. In aspects, the powder can be powdered prepolymer, powdered polymer, powdered ceramic, powdered metal, or powdered plastic. In additional aspects, the powder can be a combination of one or more powdered prepolymers, powdered polymers, powdered ceramics, powdered metals, and powdered plastics.

Examples of prepolymers and/or polymers that may be used include, but are not limited to, thermoplastic polymers, nylon, poly(amic) acids, polyimides, polyketones, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK), reduced form of polyketones, polyethersulfones, and the like. Examples of powdered ceramic that may be used include, but are not limited to, alumina, zirconia, zircon (i.e., zirconium silicate), and silicon carbide-based ceramics. Examples of powdered metals that may be used include, but are not limited to, aluminum, titanium, and iron.

IV. Permanent Binding Agents

The three-dimensional form can be made from one or more materials. In certain embodiments, the three-dimensional form may comprise a binding agent which permanently binds particles of powder together. In aspects, the first binding agent is a permanent binding agent. As used herein, a permanent binding agent is any agent that is used to bind particles of powder so as to make up the final three-dimensional form. A permanent binding agent is not removed from the printed form after completion. Any type of permanent biding agent can be used, along with the powder, to form the three-dimensional form. The permanent binding agent can be selected, along with the powder, such that the three-dimensional form has the desired properties. Examples of such permanent binding agents are well known in the art and any such permanent binding agent can be used in the methods described herein. By way of nonlimiting examples, the permanent binding agent can be colloids, polyimides, polyketones, reduced form of polyketones, polyethersulfones, and the like. In aspects, the binding agent may be an activating agent that induces polymerization of prepolymer in the powder.

In aspects the permanent binding agent may be a prepolymer. After printing, the prepolymer may be exposed to a stimulus in order to polymerize the prepolymer. Examples of such prepolymers are well known in the art and any such prepolymer can be used in the methods described herein. Examples of prepolymers include, but are not limited to, poly(amic) acids, mixtures of at least one aromatic dihydroxy compound and at least one dihalobenzoid compound or at least one halophenol compound, lactic acid, silicone resin prepolymers, combinations of copolymers, block copolymers, and isocyantes. Examples of stimuli that induce curing or polymerization of the permanent biding agent include, but are not limited to, heat, light, enzymes, electromagnetic radiation, oxidation, reduction, acid catalysis, base catalysis, transition metal catalysis, and combinations of any of thereof.

In particular aspects, the permanent binding agent may be SPEEK. Portions of the powder bed printed with SPEEK to be retained in the final product can selectively treated to render the SPEEK thereon resistant to removal. Such treatments include, but are not limited to sufficient heat to reverse the sulfonation and/or sinter the SPEEK and/or the powder to render the SPEEK insoluble.

In aspects, the permanent binding agent may be may be a liquid or may be dissolved in a solvent. The permanent binding agent, alone, suspended in a carrier, or in solution, should be of a viscosity which allows deposition by inkjet.

V. Removable Binding Agents

The three-dimensional form can be made from one or more materials. In certain embodiments, the three-dimensional form can comprise a binding agent which removably binds particles of powder together. In aspects, the second binding agent is a removable binding agent. As used herein, a removable binding agent is any agent that is used to bind particles of powder in the process of printing the three-dimensional form. A removable binding agent is removed from the printed form after completion. Any type of removable biding agent can be used, along with the powder, to form support structures that aid in the ability to reproducibly create the three-dimensional form. The removable binding agent can be selected, along with the powder, such that removable sections of the printed material have the desired properties. In a particular aspect, the removable binding agent is a solubilized PEEK such as, but not limited to, SPEEK and/or NPEEK.

After printing is complete, the removable binding agent may be exposed to a stimulus in order to remove or allow the removal of the removable binding agent from the three-dimensional form. Examples of stimuli that induce removal of the removable binding agent include, but are not limited to, heat, light, solvent, enzymes, electromagnetic radiation, oxidation, reduction, acid catalysis, base catalysis, transition metal catalysis, mechanical force, and combinations of any of thereof. In aspects, stimuli that remove or allow the removal of the removable binding agent do not degrade, alter the shape of, or remove the powder or the permanent binding agent. In certain aspects, the stimulus is a solvent. The solvent, by way of nonlimiting example, may be an aqueous solvent, and alcohol-based solvent, or a combination thereof. In particularly examples, the solvent may be ethanol based or isopropanol based.

In aspects, the removable binding agent may be solubilized PEEK such as, but not limited to, SPEEK and or NPEEK. The solubilized PEEK may be used alone, or in combination with one or more other removable binding agents. Examples of such additional removable binding agents include, but are not limited to, a wax, grease, polymer adhesive, block copolymer, copolymer, polycarbonate, poly (vinlysulfone), polycarbomate, polyphthaldehyde, or a self-immolative polymer. Included are solutions and combinations of removable binding agents. One nonlimiting examples of such a combination is a mixture of SPEEK and NPEEK.

In aspects the one or more other removable binding agent may be a prepolymer. After printing, the prepolymer may be exposed to a stimulus in order to polymerize the prepolymer. Examples of stimuli that induce curing or polymerization of the removable biding agent include, but are not limited to, heat, light, enzymes, electromagnetic radiation, oxidation, reduction, acid catalysis, base catalysis, transition metal catalysis, and combinations of any of thereof.

In aspects, the removable binding agent or combination thereof, may be may be a liquid or may be dissolved in a solvent. The removable binding agent or combination of such binding agents, alone, suspended in a carrier, or in solution, should be of a viscosity which allows deposition by inkjet.

In aspects where heat is used to remove the one or more other removable binding agent, the temperature at which the one or more other removable binding agent undergoes a temperature-controlled phase change (e.g. melting temperature) should be above the temperature of powder during printing. In addition, the temperature at which the removable binding agent undergoes a temperature-controlled phase change (e.g. melting temperature) should be above the melting, sintering, and/or fusion temperature of the powder or the permanent binding agent. In aspects where heat is used, the heat softens or melts the removable binding agent allowing it flow from or be easily removed from the three-dimensional form mechanically.

VI. SPEEK

SPEEK is a sulfonated PEEK molecule. In aspects, the SPEEK for use as a removable binder is obtained from the sulfonation of polymers of PEEK. The polymers of PEEK to be sulfonated may be of any length, but that length should be sufficient to act as a binder when deposited on powder bed. Examples of sizes of PEEK include, but are not limited to, PEEK molecules having an average molecular weight of 1 kD or more, 2 kD or more, 3 kD or more, 4 kD or more, 5 kD or more, 6 kD or more, 7 kD or more, 8 kD or more, 9 kD or more, 10 kD or more, 11 kD or more, 12 kD or more, 13 kD, 14 kD or more, 15 kD or more, 16 kD or more, 17 kD or more, 18 kD or more, 19 kD or more, 20 kD or more, 25 kD or more, 30 kD or more, 35 kD or more, 40 kD or more, 45 kD, 50 kD or more, 75 kD or more, 100 kD or more, 125 kD or more, 150 kD or more, 175 kD or more, 200 kD or more, or 250 kD or more. Un-sulfonated PEEK is not soluble in aqueous or alcohol-based solvents. Once sulfonated, the resulting SPEEK is soluble in aqueous or alcohol-based solvents.

Synthesis of SPEEK

Figure 2:
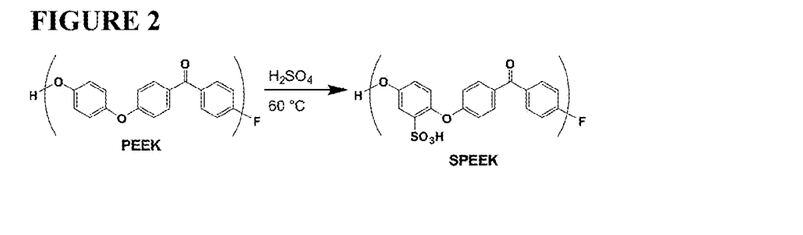
FIG. 2 provides a chemical representation of the process for the sulfonation of PEEK to form SPEEK.

PEEK is commercially available from a number of sources including, but not limited to Victrex and Evonik. Sulfonation of commercially available PEEK was performed by stirring the PEEK in a concentrated (approximately 95% to 98%) sulfuric acid at 60° C. for 20 to 24 hours (see FIG. 2). The SPEEK was then precipitated in deionized water. A yellow to orange solid was obtained after filtration and drying at 60° C. The degree of sulfonation was found to be approximately 93% to 95% by NMR.

De-Sulfonation of SPEEK

Figure 3:
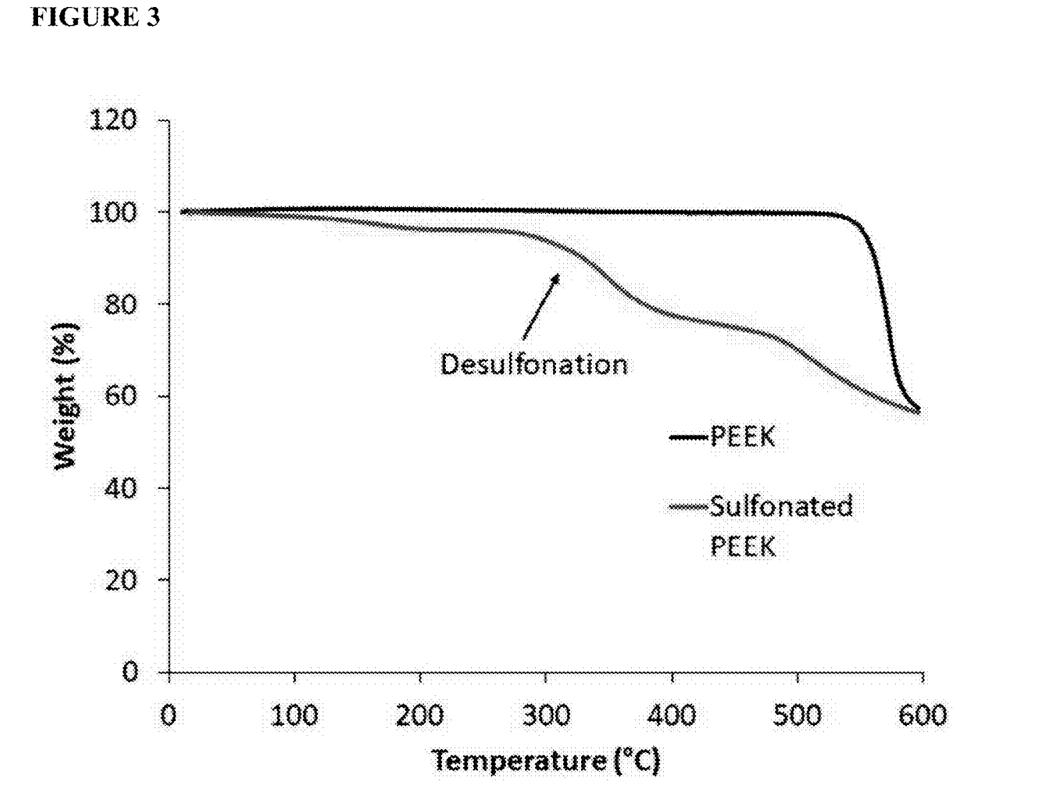
FIG. 3 illustrates the temperature stability as indicated by weight percent of PEEK and SPEEK.
Figure 4:
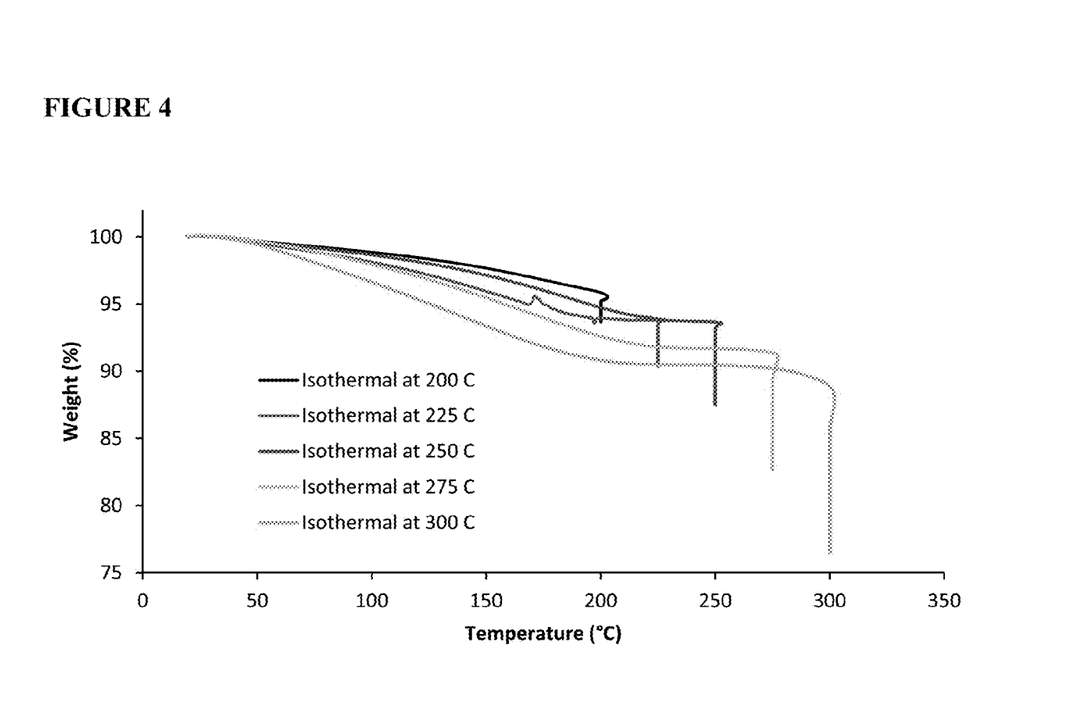
FIG. 4 illustrates the temperature stability as indicated by weight percent of PEEK and SPEEK when held as specific temperatures.

SPEEK may be de-sulfonated by stimulus that heats the SPEEK to a temperature at which the sulfonation is removed from the SPEEK. As demonstrated in FIG. 3, when the SPEEK is heated to between 200° C. and 400° C., the SPEEK is de-sulfonated. This is represented in FIG. 3 by the loss of the weight of the sulfur containing moieties from the overall weight of the SPEEK. The extended constant-temperature stability profile of SPEEK was further investigated by thermogravimetric analysis. The results are summarized in FIG. 4. The temperature was increased at a rate of 10° C./min until the target temperature was achieved. Then, the temperature was held constant for 6 hours. At 200° C., we observed 1% weight loss after 6 hours, and at 225° C. the weight loss after 6 hours was 3%. The results for all five temperatures tested are presented in Table 1 below.

TABLE 1

Results of isothermal TGA of SPEEK

| Isothermal temperature for 6 hours (° C.) | Weight loss (%) |
| --- | --- |
| 200 | 1 |
| 225 | 3 |
| 250 | 6.1 |
| 275 | 8.6 |
| 300 | 12.3 |

Examples of stimuli that can be used to raise the temperature of SPEEK include heating or exposure to electromagnetic radiation (such as, but not limited to, a laser). In embodiments, the SPEEK may be de-sulfonated via raising it to a temperature greater than 200° C. and less than 400° C., a temperature greater than 250° C. and less than 350° C., or to 300° C. Thus, the SPEEK can be heated to a temperature of about 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., and the like.

VII. NPEEK

NPEEK is a nitrated PEEK molecule. In aspects, the NPEEK for use as a removable binder is obtained from the nitration of polymers of PEEK. The polymers of PEEK to be sulfonated may be of any length, but that length should be sufficient to act as a binder when deposited on powder bed. Examples of sizes of PEEK include, but are not limited to, PEEK molecules having an average molecular weight of 1 kD or more, 2 kD or more, 3 kD or more, 4 kD or more, 5 kD or more, 6 kD or more, 7 kD or more, 8 kD or more, 9 kD or more, 10 kD or more, 11 kD or more, 12 kD or more, 13 kD, 14 kD or more, 15 kD or more, 16 kD or more, 17 kD or more, 18 kD or more, 19 kD or more, 20 kD or more, 25 kD or more, 30 kD or more, 35 kD or more, 40 kD or more, 45 kD, 50 kD or more, 75 kD or more, 100 kD or more, 125 kD or more, 150 kD or more, 175 kD or more, 200 kD or more, or 250 kD or more. Un-nitrated PEEK is not soluble in aqueous or alcohol-based solvents. Once nitrated, the resulting NPEEK is soluble in aqueous or alcohol-based solvents.

Synthesis of NPEEK

Figure 5:
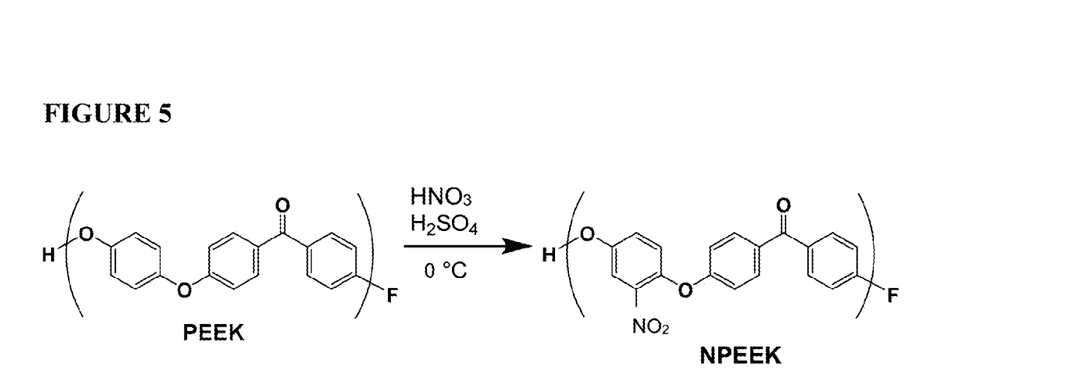
FIG. 5 provides a chemical representation of the process for the nitration of PEEK to form NPEEK.

PEEK is commercially available from a number of sources including, but not limited to Victrex and Evonik. nitration of commercially available PEEK was performed by stirring the PEEK in concentrated sulfuric acid and nitric acid at 0° C. for 20 to 24 hours (see FIG. 5). A solid was obtained after filtration and drying at 60° C.

VIII. Printing

A powder, a first binding agent, and a second binding agent can be used in a process to create three-dimensional articles using a three-dimensional printing system. A three-dimensional printing system can have a computer, a three-dimensional printer, means for dispensing the powder, and one or more means for dispensing the first and second binding agents. In aspects, one means may be used for dispensing both the first and the second binding agents. In other aspects, each of the first and second binding agents may have a separate means of being dispensed. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). Thus, the computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

Typically, a first layer of the powder can be deposited onto a build plate. The deposited powder is preferably heated to a temperature that is less than about 200° C., and can be in the range of about 30° C. to 170° C., or in the range of about 50° C. to about 150° C. The temperature is selected such that it is below that at which melting, sintering, and/or fusion of the powder occurs. Where the powder is a prepolymer, the temperature may be selected so that it aids in the polymerization of the of the prepolymer when the first binding agent is added. Thus, the deposited powder can be heated to a build temperature of about 40° C., 50° C., 60° C., 70° C., 80° C., 100° C., 110° C., 120° C., 130° C., 140° C., 150° C., 160° C., 170° C., 180° C., 190° C., 200° C., 210° C., 220° C., 230° C., 240° C., 250° C., and the like. The deposited powder can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the prepolymer solid or powder using a laser or a laser diode, such as, for example, a scanning carbon dioxide laser.

The first layer of the powder can be deposited onto the build plate using any of the known methods, such as, using a roller, using a scraper, using mechanical means, and the like. Thus, for example, a measured quantity of the powder can be distributed over the build plate to a desired thickness using a roller. In another aspect, the layer of the powder can have a thickness of about 0.1 nm to less than 500 nm, of about 5 nm to about 250 nm, of about 0.2 nm to about 100 nm, of about 0.3 nm to about 50 nm, of about 0.3 nm to about 25 nm, of about 0.3 nm to about 20 nm, of about 0.3 nm to about 15 nm, of about 0.3 nm to about 10 nm, of about 0.3 nm to about 5 nm, and the like. In yet another aspect, the layer of the powder can have a thickness of about 10 microns to less than about 500 microns, of about 25 microns to about 250 microns, or of about 50 microns to about 100 microns.

Figure 1:
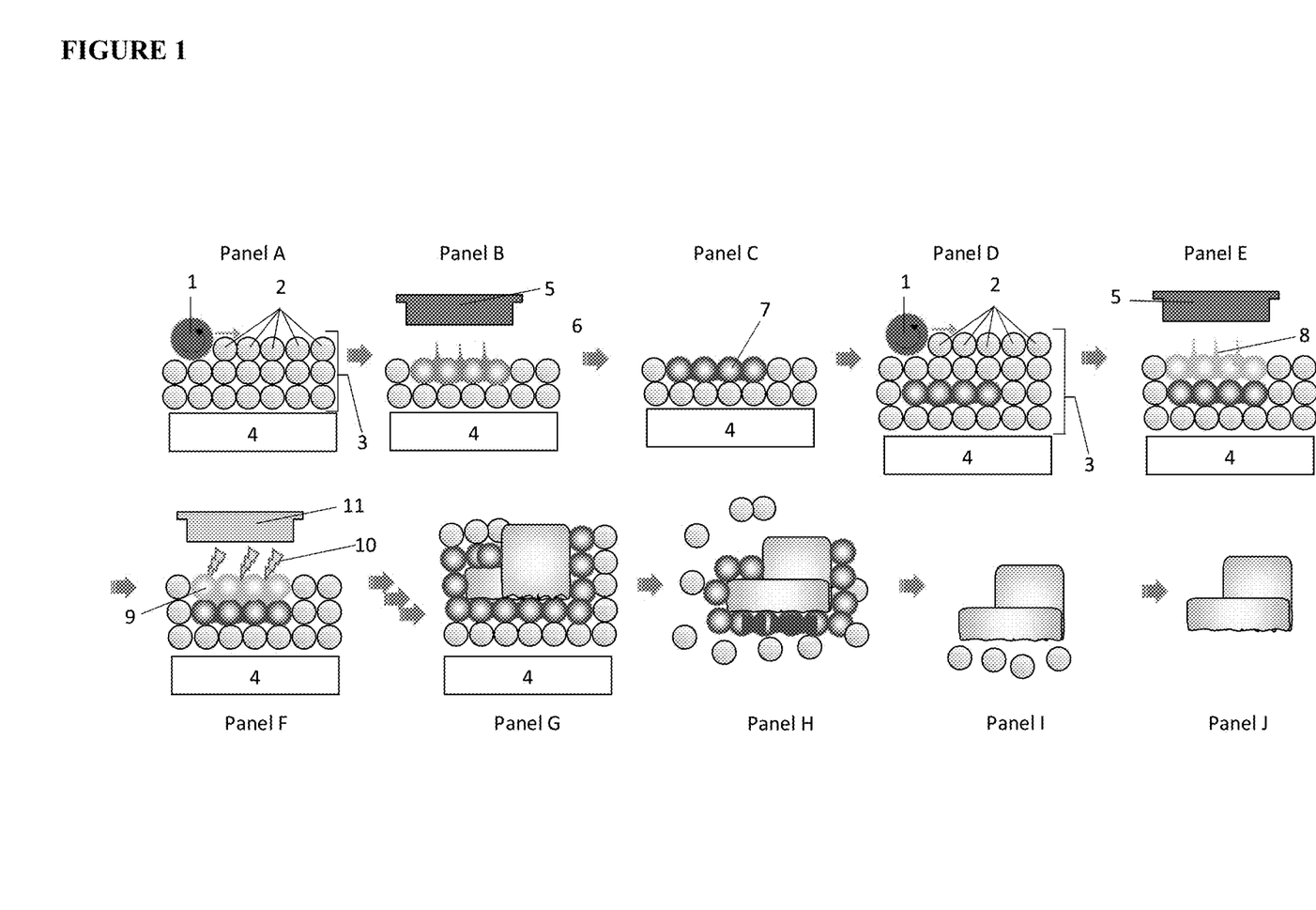
FIG. 1 illustrates a method of printing a three-dimensional article layer by layer as disclosed herein.

The method of printing a three-dimensional article layer by layer is illustrated in FIG. 1. In Panel A of FIG. 1, the roller 1, deposits powder 2 from one or more powder bed reservoirs to the powder bed 3. The build plate 4 can move in vertical direction as needed. In Panel B of FIG. 1, the head 5 prints a second binding agent 6 on the powder bed 3. The the second binding agent can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the second binding agent in a predefined pattern.

In Panel C of FIG. 1, after the printing of the second binding agent, a support structure 7 is formed from the powder and the second binding agent. If required or desired, the second binding agent may be exposed to a stimulus to bind the powder on which it was deposited. In aspects, the stimulus may be heat or light.

In Panel D of FIG. 1, the roller 1, deposits a new powder layer of powder 2 from one or more powder bed reservoirs to the powder bed 3. In Panel E of FIG. 1, the head 5 prints a first binding agent 8 on the powder bed 3. The first binding agent can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the first binding agent in a predefined pattern.

In Panel F of FIG. 1, after the printing of the first binding agent, a permanent structure 9 is formed from the powder and the first binding agent. If required or desired, the first binding agent may be exposed to a stimulus 10 from a stimulus source 11 to bind the powder on which it was deposited. In aspects, the stimulus may be heat, light, enzymes, electromagnetic radiation, oxidation, reduction, acid catalysis, base catalysis, transition metal catalysis, and combinations of any of thereof.

The process of Panels A-F of FIG. 1 may be repeated as desired to build, layer upon layer, a permanent structure and support structures as depicted in Panel G. Where permanent structures and support structures are present in the same layer, the process of Panels B and C as well as Panels E and F may be performed sequentially or concurrently.

After the last layer has been printed, any unbound powder may be removed as is depicted in FIG. 1, Panel H. As shown in FIG. 1, Panel I, the second binding agent is then removed to free any power bound thereby. Removal of the second binding agent may be utilizing a stimulus such as, but not limited to heat, light, solvent, enzymes, electromagnetic radiation, oxidation, reduction, acid catalysis, base catalysis, transition metal catalysis, mechanical force, and combinations of any of thereof. In aspects, stimuli that remove or allow the removal of the removable binding agent do not degrade, alter the shape of, or remove the powder or the first binding agent. In further aspects, removal of the second binding agent may be performed by immersion of the object in a solvent, a dispersion, or solution that is the stimulus or contains the stimulus After removal of the second binding agent and any powder bound thereby, the final product, as depicted in FIG. 1, Panel J is obtained. Thus, a three-dimensional article can be built layer by layer by depositing a series of powder layers on a build plate to form a powder bed, and printing a first and second agents onto the powder bed.

VIII. Curing

The three-dimensional article obtained using the methods and processes described above can be cured to obtain the final three-dimensional article. The curing of the article can be done while it is attached to the build plate, or the curing of the article can be done by separating it from the build plate first and then curing it. In certain aspects, the second binding agent, as well as the powder treated with the second binding agent, is removed from the article before curing. In the curing process, where the polymer or the first binding agent is a prepolymer, any unreacted prepolymer is converted to the final polymer. Thus, for example, if the prepolymer is poly(amic acid), the unreacted poly(amic acid) is converted to the polyimide polymer via imidization during the curing process.

In one aspect, during the curing process, poly(amic acid) can be converted to a polyimide polymer by dehydration wherein water is eliminated. Imidization to produce the polyimide, i.e. ring closure in the poly(amic acid), can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In one aspect, chemical imidization can be used to convert poly(amic acid) to the polyimide. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the curing at elevated temperatures can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used.

Further, also longer times, such as up to 10 hours may be used. Subsequently, the temperature can be increased in steps. Each step may correspond to an increase of the temperature of 10° C. to 50° C. Further, each step may have duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Curing the final product at elevated temperatures can be performed with continuously increasing temperature. Preferably, the heating rate is slow initially but gradually increased as the temperature increases. Thus, for example, the heating process can start at 150° C. and the temperature is increased continuously until 300° C. or above is reached.

The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of the invention are useful in circuit applications, medical applications, transportation applications, and the like. For example, the three-dimensional articles can be a printed circuit, an insulator, a medical construct such as an orthotic device, a dental implant, prosthetic sockets, and the like, seal rings, washers, and the like.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for manufacturing a three-dimensional article, the method comprising:
    (a) depositing a powder on a build plate to form a powder bed;
    (b) printing, at selected locations on the powder bed, a solution of a first binding agent;
    (c) printing, at selected locations on the powder bed, a solution of a second binding agent;
    (d) exposing the first binding agent to a stimulus to form a polymer layer;
        repeating steps (a), (b), and (d) to manufacture the remainder of the three-dimensional article; and
        removing the second binding agent;
    wherein the first and second binding agents are each printed at least once; wherein the first and second binding agents are printed at different selected locations on the power bed; and
    wherein the second binding agent comprises a solubilized nitrated polyetheretherketone.

2. The method according to claim 1, wherein particles bound by the second binding agent provide physical support to selected locations bound by the first binding agent.

3. The method according to claim 1, wherein the first and second binding agents are applied to the powder bed simultaneously.

4. The method according to claim 1, wherein stimulus comprises heat, light, oxidation, acid catalysis, base catalysis, transition metal catalysis, or combination thereof.

5. The method according to claim 1, wherein removing the second binding agent releases powder previously bound by the second binding agent.

6. The method according to claim 1, wherein the removing the second binding agent comprises removing the second binding agent with a solvent.

7. The method according to claim 1, wherein the powder is selected from the group consisting of prepolymers, polymers, ceramics, metals, and plastics.

8. The method according to claim 1, wherein the first binding agent is selected from the group consisting of prepolymers, polymers, copolymers, block copolymers, and plastics.

9. The method according to claim 8, wherein the first binding agent is heated to a temperature of between 200° C. and 400° C.

10. The method according to claim 6, wherein the solvent is an aqueous and/or alcohol solvent.

* * * * *